US012652421B2

(12) United States Patent
Chinnaiyan et al.

(10) Patent No.: US 12,652,421 B2
(45) Date of Patent: *Jun. 9, 2026

(54) METHOD AND APPARATUS FOR PRE-BUFFER MEDIA STORAGE

(71) Applicant: GoPro, Inc., San Mateo, CA (US)

(72) Inventors: Anandhakumar Chinnaiyan, Fremont, CA (US); Michael A. Ramirez, Mountain View, CA (US); Naveen Chinya Krishnamurthy, Fremont, CA (US); Feng Li, Cupertino, CA (US)

(73) Assignee: GoPro, Inc., San Mateo, CA (US)

( * ) Notice: Subject to any disclaimer, the term of this patent is extended or adjusted under 35 U.S.C. 154(b) by 1145 days.

This patent is subject to a terminal disclaimer.

(21) Appl. No.: 17/677,331

(22) Filed: Feb. 22, 2022

(65) Prior Publication Data

US 2022/0174335 A1 Jun. 2, 2022

Related U.S. Application Data

(63) Continuation-in-part of application No. 17/326,058, filed on May 20, 2021, now Pat. No. 11,849,248.

(60) Provisional application No. 63/031,156, filed on May 28, 2020.

(51) Int. Cl.
*H04N 21/234* (2011.01)
*H04N 21/2343* (2011.01)

(52) U.S. Cl.
CPC ................. *H04N 21/23406* (2013.01); *H04N 21/234345* (2013.01)

(58) Field of Classification Search
CPC .................................................... H04N 25/713
See application file for complete search history.

(56) References Cited

U.S. PATENT DOCUMENTS

| | | | |
|---|---|---|---|
| 11,849,248 B2 * | 12/2023 | Chinnaiyan ............ | H04N 5/772 |
| 2009/0051768 A1 * | 2/2009 | DeKeyser ............ | G11B 23/288 |
| | | | 348/143 |

* cited by examiner

*Primary Examiner* — Lin Ye
*Assistant Examiner* — Fayez A Bhuiyan
(74) *Attorney, Agent, or Firm* — Young Basile Hanlon & MacFarlane, P.C.

(57) ABSTRACT

Image capture devices and methods may be used to pre-buffer media storage. The pre-buffering method includes recording an image capture segment of a variable bitrate input stream in a circular buffer. The circular buffer includes a number of recordable segments. The method includes recording a next image capture segment in a next adjacent recordable segment of the circular buffer if the next adjacent recordable segment of the predetermined number of recordable segments is available. The method includes overwriting an oldest recordable segment if the next adjacent recordable segment of the predetermined number of recordable segments is not available.

20 Claims, 12 Drawing Sheets

900

DETERMINE PRE-BUFFER SIZE —— 910

DETERMINE HIGHEST ALLOWABLE BITRATE —— 920

ADJUST PRE-BUFFER SIZE —— 930

METHOD AND APPARATUS FOR PRE-BUFFER MEDIA STORAGE

CROSS-REFERENCE TO RELATED APPLICATION(S)

This application is a continuation-in-part of U.S. patent application Ser. No. 17/326,058, filed May 20, 2021, which claims priority to and the benefit of U.S. Provisional Application Patent Ser. No. 63/031,156, filed May 28, 2020, the entire disclosure of which is hereby incorporated by reference.

TECHNICAL FIELD

This disclosure relates to image processing. In particular, this disclosure relates to pre-buffering media storage.

BACKGROUND

When recording video, users often miss key moments due to slow reaction times and image processing delays. In order to capture a key moment, a substantial amount of data must be collected to ensure that the key moment has not been missed, requiring large volumes of storage. In addition, hours of time may be wasted manually reviewing the vast amount of data to identify the key moments. Accordingly, it would be desirable to have a system and method for automatically capturing key moments with reduced data and storage requirements.

SUMMARY

Disclosed herein are implementations of image capture devices and methods for pre-buffer media storage. In an aspect, pre-buffering method may include recording an image capture segment in a circular buffer. The circular buffer may include a number of recordable segments. The number of recordable segments may be predetermined. The pre-buffering method may include determining whether a key moment command is received. If a key moment command is not received, the method may include recording a next image capture segment in a next adjacent recordable segment of the circular buffer if the next adjacent recordable segment of the predetermined number of recordable segments is available. If a key moment command is not received, the method may include overwriting an oldest recordable segment if the next adjacent recordable segment of the predetermined number of recordable segments is not available. If a key moment command is received, the pre-buffering method may include marking a wrap point in the circular buffer, switching from recording in the circular buffer to linear recording, or both.

In an aspect, an image capture device may include a memory and a processor. The memory may include a circular buffer. The circular buffer may be configured to record an image capture segment. The circular buffer may include a number of recordable segments. The number of recordable segments may be predetermined. The processor may be configured to determine whether a key moment command is received. If a key moment command is not received, the memory may be configured to record a next image capture segment in a next adjacent recordable segment of the circular buffer if the next adjacent recordable segment of the predetermined number of recordable segments is available. If a key moment command is not received, the memory may be configured to overwrite an oldest recordable segment if the next adjacent recordable segment of the predetermined number of recordable segments is not available. If a key moment command is received, the processor may be configured to mark a wrap point in the circular buffer, switch from recording in the circular buffer to linear recording, or both.

In an aspect, a storage device may include a memory. The memory may include a circular buffer. The circular buffer may be configured to record a data segment. The circular buffer may include a predetermined number of recordable segments. The circular buffer may be configured to record a next data segment in a next adjacent recordable segment if the next adjacent recordable segment of the predetermined number of recordable segments is available. The circular buffer may be configured to overwrite an oldest recordable segment if the next adjacent recordable segment of the predetermined number of recordable segments is not available.

In an aspect, a pre-buffering method may include recording an image capture segment of a variable bitrate input stream in a circular buffer. The circular buffer may include a duration. The duration may be based on a predetermined number of recordable segments. The pre-buffering method may include determining a highest allowable bitrate for the variable bitrate input stream. The pre-buffering method may include dynamically adjusting the duration of the circular buffer based on the highest allowable bitrate. The pre-buffering method may include recording a next image capture segment in a next adjacent recordable segment of the circular buffer when the next adjacent recordable segment of the predetermined number of recordable segments is available. The pre-buffering method may include overwriting an oldest recordable segment when the next adjacent recordable segment of the predetermined number of recordable segments is not available.

In an aspect, an image capture device may include a memory and a processor. The memory may include a circular buffer configured to record an image capture segment of a variable bitrate input stream. The circular buffer may include a duration based on a predetermined number of recordable segments. The processor may be configured to determine a highest allowable bitrate for the variable bitrate input stream. The processor may be configured to increase the number of the predetermined number of recordable segments based on the highest allowable bitrate to adjust the duration of the circular buffer. The memory may be configured to record a next image capture segment in a next adjacent recordable segment of the circular buffer when the next adjacent recordable segment of the increased number of the predetermined number of recordable segments is available. The memory may be configured to overwrite an oldest recordable segment when the next adjacent recordable segment of the increased number of the predetermined number of recordable segments is not available.

In an aspect, a storage device may include a memory. The memory may include a dynamically adjustable circular buffer. The dynamically adjustable circular buffer may be configured to record a data segment of a variable bitrate input stream. The dynamically adjustable circular buffer may include a predetermined number of recordable segments. The dynamically adjustable circular buffer may be configured to adjust a number of the predetermined number of recordable segments based on the variable bitrate input stream. The dynamically adjustable circular buffer may be configured to record a next data segment in a next adjacent recordable segment of the dynamically adjustable circular buffer when the next adjacent recordable segment of the adjusted number of the predetermined number of recordable segments is available. The dynamically adjustable circular buffer may be configured to overwrite an oldest recordable segment of the adjusted number of the predetermined number of the recordable segments is not available.

In one or more aspects, the key moment command may be associated with a shutter button press, an audio command, or a touch display input. In one or more aspects, each or the predetermined number of recordable segments may have a predetermined duration of time. In one or more aspects, the predetermined duration of time may be in a range of approximately 0.5 seconds to approximately 30 seconds. In one or more aspects, the processor may be configured to stop the circular buffer recording. In one or more aspects, the duration of the circular buffer may be dynamically adjusted to increase or decrease the number of the predetermined number of recordable segments. In one or more aspects, recording in the circular buffer may be switched to recording in a linear buffer. In one or more aspects, the memory may be configured to perform linear recording by recording frames in a portion of the memory outside the circular buffer. In one or more aspects, a determination may be made as to whether an input is received. If an input is received, the linear recording may be stopped. If an input is not received, the linear recording may continue. In one or more aspects, the input may be a button press, an audio command, or a touch display input. In one or more aspects, the input may be an indication or a command to stop linear recording. In one or more aspects, the memory may be a secure digital (SD) card. In one or more aspects, the circular buffer, the linear recording, or both, may be stored on the SD card. In one or more aspects, the memory may be configured to store the circular buffer and the linear recording in a media file format. The media file format may include a first portion and a second portion. In one or more aspects, the first portion may be an mdat portion. In one or more aspects, the second portion may be a moov portion. In one or more aspects, the mdat portion may include a pre-buffer portion and the linear recording portion. In one or more aspects, the pre-buffer portion may include a first portion of frames and a second portion of frames. In one or more aspects, the first portion of frames may be recorded temporally prior to the second portion of frames. In one or more aspects, the second portion of frames may be stored spatially prior to the first portion of frames. In one or more aspects, the linear recording portion may include a third portion of frames. In one or more aspects, the third portion of frames may be recorded temporally after the first portion of frames, the second portion of frames, or both. In one or more aspects, the third portion of frames may be stored spatially after the first portion of frames, the second portion of frames, or both. In one or more aspects, the third portion of frames may be stored adjacent to the first portion of frames. In one or more aspects, the moov portion may include a first index associated with the first portion of frames, a second index associated with the second portion of frames, and a third index associated with the third portion of frames. In one or more aspects, the first index, the second index, and the third index may be used for video playback.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The embodiments disclosed herein provide an efficient mechanism to store pre-buffer media such that transition from pre-buffer to linear recording is seamless, and with no delay at the end of the recording. The embodiments disclosed herein allow a user to actively record multiple segments in a pre-buffer, such as a circular buffer. The pre-buffer recording and the linear recording may be stored in a single media file.

An image capture device may enter a pre-buffer mode based on a user input. In pre-buffer mode, the image capture device captures and stores media in the pre-buffer. The pre-buffer has a predetermined recording duration, and once the predetermined recording duration is exhausted, the oldest frames are overwritten. Since only the most recent frames are being continuously stored, the overhead and storage requirements are greatly reduced. An automatic switch to linear recording from pre-buffering occurs in response to a user input, such as a shutter button press.

Figure 1A:
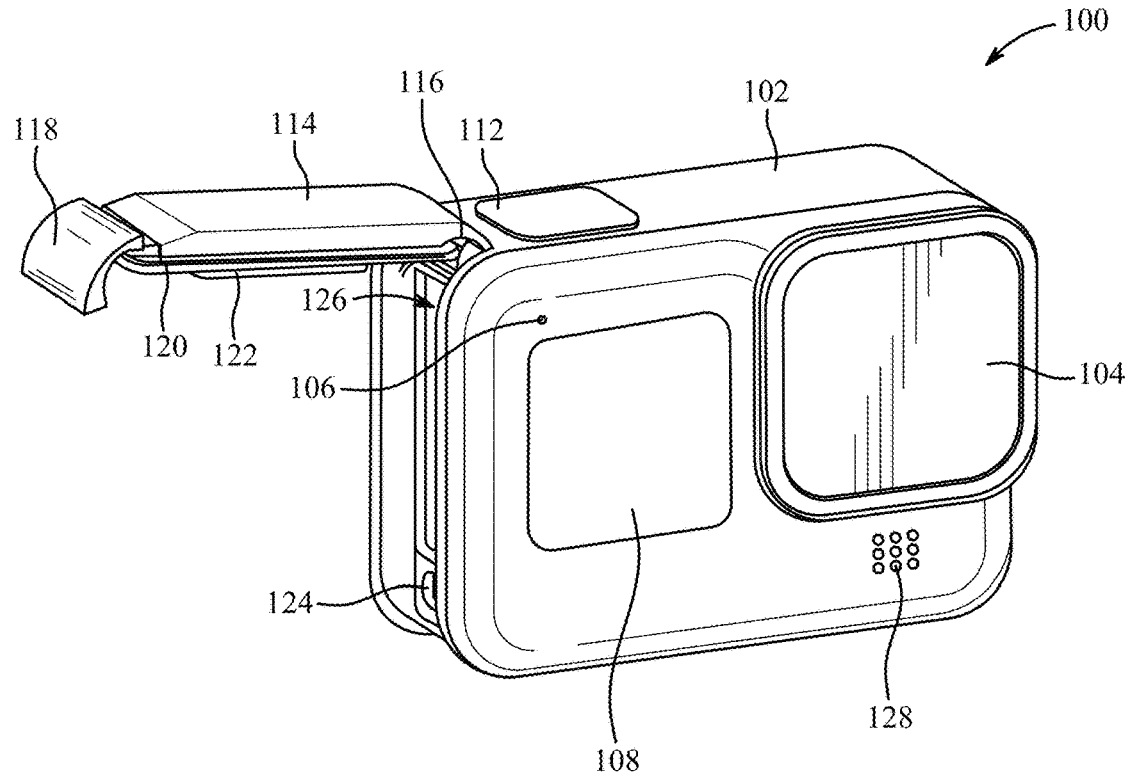
FIGS. 1A-B are isometric views of an example of an image capture device.
Figure 1B:
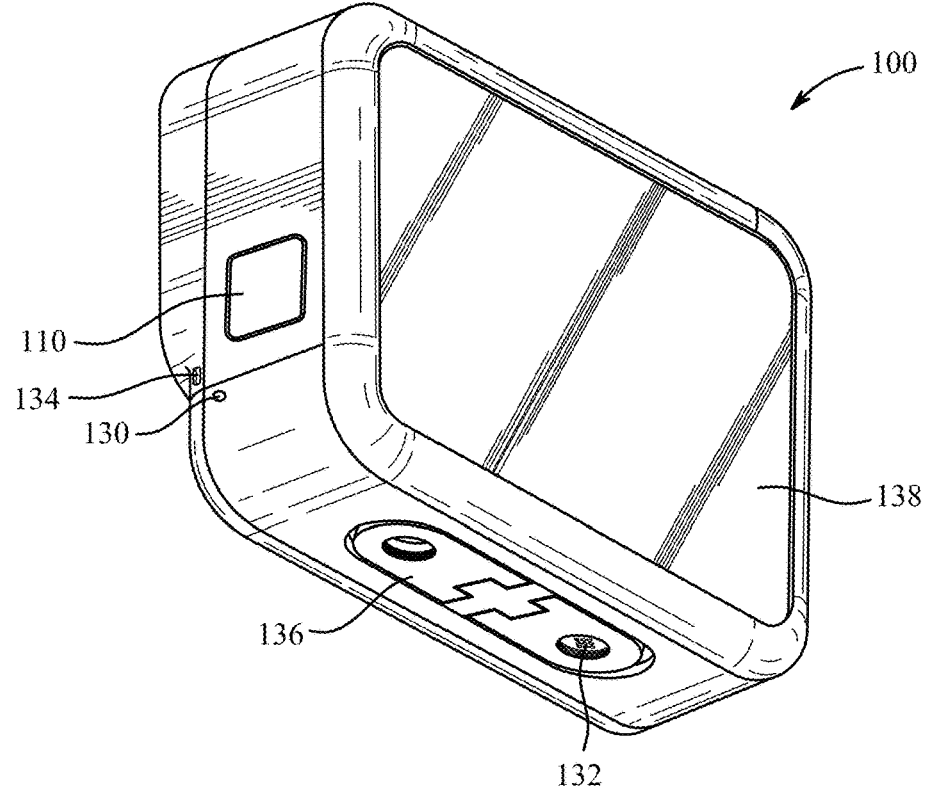

FIGS. 1A-B are isometric views of an example of an image capture device 100. The image capture device 100 may include a body 102, a lens 104 structured on a front surface of the body 102, various indicators on the front surface of the body 102 (such as light-emitting diodes (LEDs), displays, and the like), various input mechanisms (such as buttons, switches, and/or touch-screens), and electronics (such as imaging electronics, power electronics, etc.) internal to the body 102 for capturing images via the lens 104 and/or performing other functions. The lens 104 is configured to receive light incident upon the lens 104 and to direct received light onto an image sensor internal to the body 102. The image capture device 100 may be configured to capture images and video and to store captured images and video for subsequent display or playback.

The image capture device 100 may include an LED or another form of indicator 106 to indicate a status of the image capture device 100 and a liquid-crystal display (LCD) or other form of a display 108 to show status information such as battery life, camera mode, elapsed time, and the like. The image capture device 100 may also include a mode button 110 and a shutter button 112 that are configured to allow a user of the image capture device 100 to interact with the image capture device 100. For example, the mode button 110 and the shutter button 112 may be used to turn the image capture device 100 on and off, scroll through modes and settings, and select modes and change settings. The image capture device 100 may include additional buttons or interfaces (not shown) to support and/or control additional functionality.

The image capture device 100 may include a door 114 coupled to the body 102, for example, using a hinge mechanism 116. The door 114 may be secured to the body 102 using a latch mechanism 118 that releasably engages the body 102 at a position generally opposite the hinge mechanism 116. The door 114 may also include a seal 120 and a battery interface 122. When the door 114 is an open position, access is provided to an input-output (I/O) interface 124 for connecting to or communicating with external devices as described below and to a battery receptacle 126 for placement and replacement of a battery (not shown). The battery receptacle 126 includes operative connections (not shown) for power transfer between the battery and the image capture device 100. When the door 114 is in a closed position, the seal 120 engages a flange (not shown) or other interface to provide an environmental seal, and the battery interface 122 engages the battery to secure the battery in the battery receptacle 126. The door 114 can also have a removed position (not shown) where the entire door 114 is separated from the image capture device 100, that is, where both the hinge mechanism 116 and the latch mechanism 118 are decoupled from the body 102 to allow the door 114 to be removed from the image capture device 100.

The image capture device 100 may include a microphone 128 on a front surface and another microphone 130 on a side surface. The image capture device 100 may include other microphones on other surfaces (not shown). The microphones 128, 130 may be configured to receive and record audio signals in conjunction with recording video or separate from recording of video. The image capture device 100 may include a speaker 132 on a bottom surface of the image capture device 100. The image capture device 100 may include other speakers on other surfaces (not shown). The speaker 132 may be configured to play back recorded audio or emit sounds associated with notifications.

A front surface of the image capture device 100 may include a drainage channel 134. A bottom surface of the image capture device 100 may include an interconnect mechanism 136 for connecting the image capture device 100 to a handle grip or other securing device. In the example shown in FIG. 1B, the interconnect mechanism 136 includes folding protrusions configured to move between a nested or collapsed position as shown and an extended or open position (not shown) that facilitates coupling of the protrusions to mating protrusions of other devices such as handle grips, mounts, clips, or like devices.

The image capture device 100 may include an interactive display 138 that allows for interaction with the image capture device 100 while simultaneously displaying information on a surface of the image capture device 100.

The image capture device 100 of FIGS. 1A-B includes an exterior that encompasses and protects internal electronics. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes, and hot shoes that can add functional features to the image capture device 100.

The image capture device 100 may include various types of image sensors, such as charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera system-on-chip (SoC), etc.), which may be included on one or more circuit boards within the body 102 of the image capture device 100.

The image capture device 100 may interface with or communicate with an external device, such as an external user interface device (not shown), via a wired or wireless computing communication link (e.g., the I/O interface 124). Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the external user interface device via the computing communication link, and the external user interface device may store, process, display, or a combination thereof the panoramic images.

The external user interface device may be a computing device, such as a smartphone, a tablet computer, a phablet, a smart watch, a portable computer, personal computing device, and/or another device or combination of devices configured to receive user input, communicate information with the image capture device 100 via the computing communication link, or receive user input and communicate information with the image capture device 100 via the computing communication link.

The external user interface device may display, or otherwise present, content, such as images or video, acquired by the image capture device 100. For example, a display of the external user interface device may be a viewport into the three-dimensional space represented by the panoramic images or video captured or created by the image capture device 100.

The external user interface device may communicate information, such as metadata, to the image capture device 100. For example, the external user interface device may send orientation information of the external user interface device with respect to a defined coordinate system to the image capture device 100, such that the image capture device 100 may determine an orientation of the external user interface device relative to the image capture device 100.

Based on the determined orientation, the image capture device 100 may identify a portion of the panoramic images or video captured by the image capture device 100 for the image capture device 100 to send to the external user interface device for presentation as the viewport. In some implementations, based on the determined orientation, the image capture device 100 may determine the location of the external user interface device and/or the dimensions for viewing of a portion of the panoramic images or video.

The external user interface device may implement or execute one or more applications to manage or control the image capture device 100. For example, the external user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the external user interface device, such as via an application, may remotely control the image capture device 100 such as in response to user input.

The external user interface device, such as via an application, may display unprocessed or minimally processed images or video captured by the image capture device 100 contemporaneously with capturing the images or video by the image capture device 100, such as for shot framing or live preview, and which may be performed in response to user input. In some implementations, the external user interface device, such as via an application, may mark one or more key moments contemporaneously with capturing the images or video by the image capture device 100, such as with a tag or highlight in response to a user input or user gesture.

The external user interface device, such as via an application, may display or otherwise present marks or tags associated with images or video, such as in response to user input. For example, marks may be presented in a camera roll application for location review and/or playback of video highlights.

The external user interface device, such as via an application, may wirelessly control camera software, hardware, or both. For example, the external user interface device may include a web-based graphical interface accessible by a user for selecting a live or previously recorded video stream from the image capture device 100 for display on the external user interface device.

The external user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 6:
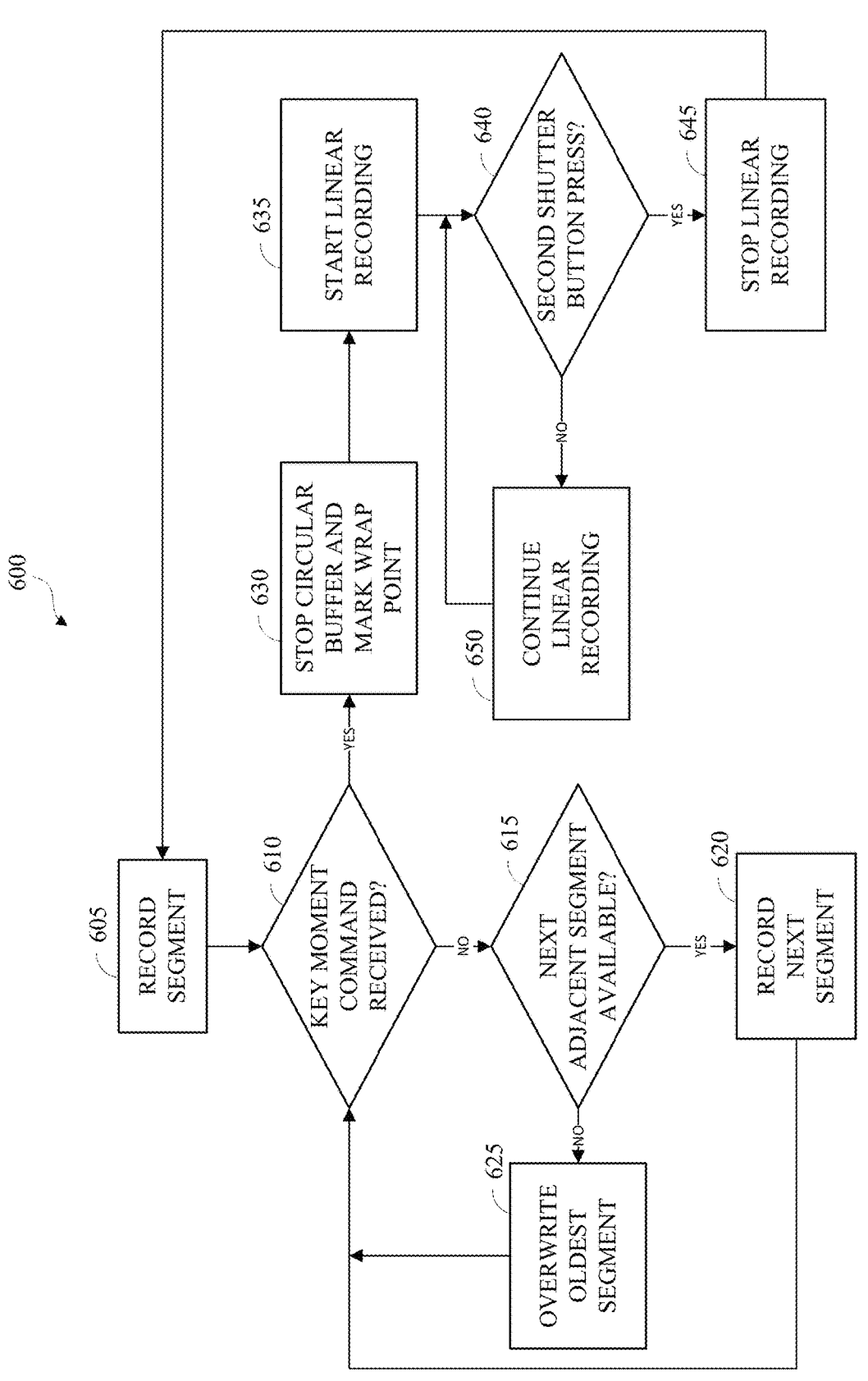
FIG. 6 is a flow diagram of an example method for pre-buffer media storage.

The image capture device 100 may be used to implement some or all of the techniques described in this disclosure, such as the technique 600 described in FIG. 6.

Figure 2A:
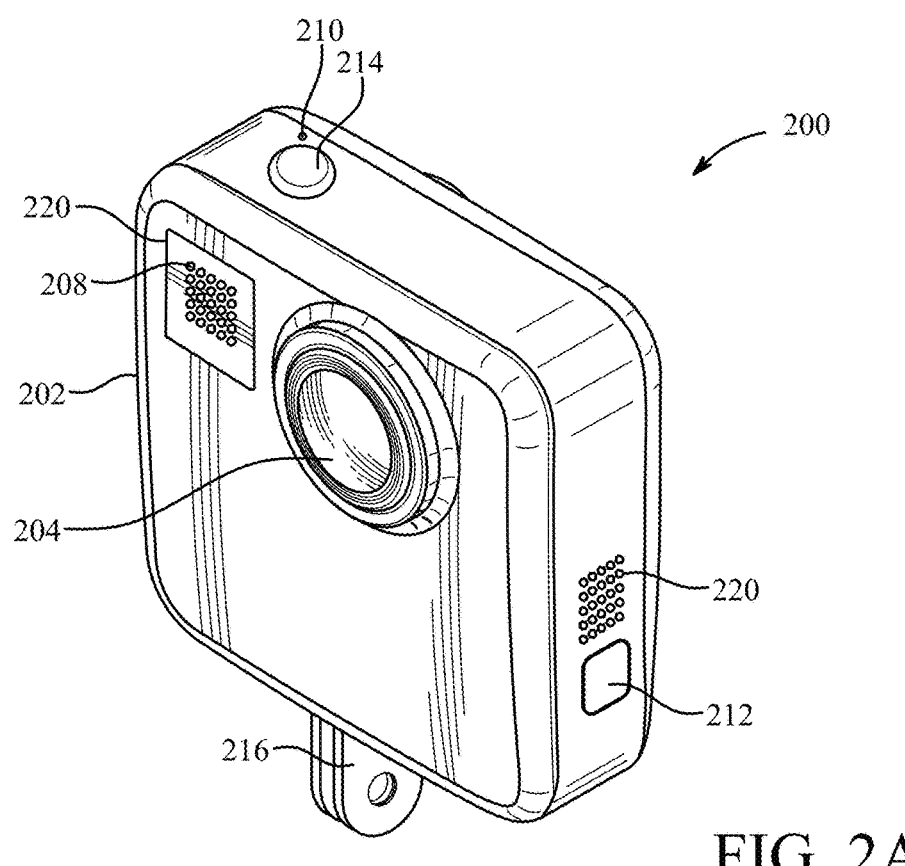
FIGS. 2A-B are isometric views of another example of an image capture device.
Figure 2B:
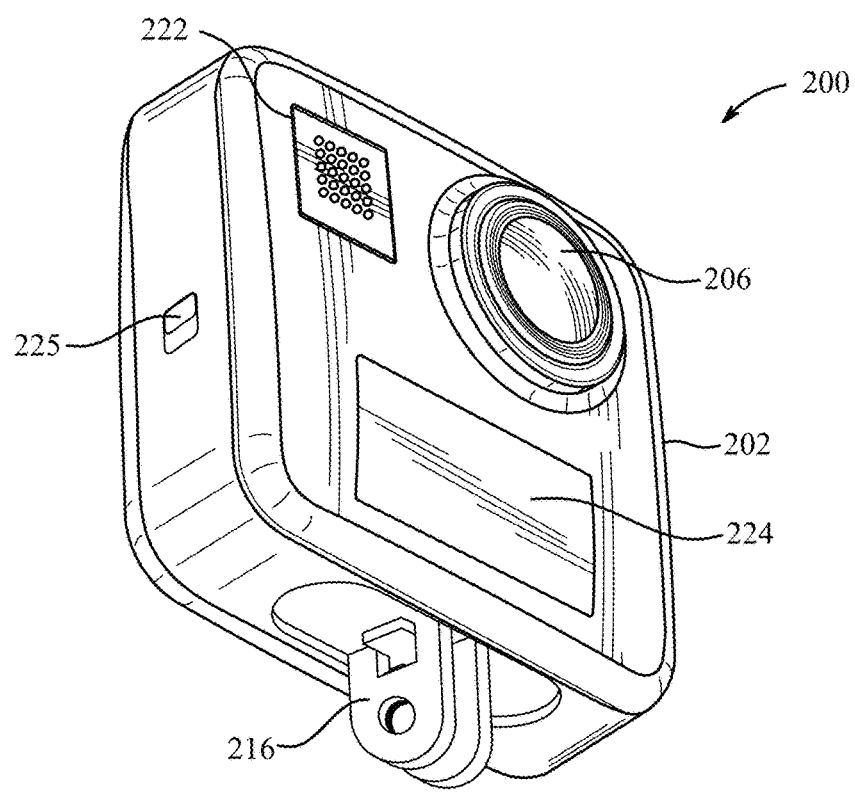

FIGS. 2A-B illustrate another example of an image capture device 200. The image capture device 200 includes a body 202 and two camera lenses 204 and 206 disposed on opposing surfaces of the body 202, for example, in a back-to-back configuration, Janus configuration, or offset Janus configuration. The body 202 of the image capture device 200 may be made of a rigid material such as plastic, aluminum, steel, or fiberglass.

The image capture device 200 includes various indicators on the front of the surface of the body 202 (such as LEDs, displays, and the like), various input mechanisms (such as buttons, switches, and touch-screen mechanisms), and electronics (e.g., imaging electronics, power electronics, etc.) internal to the body 202 that are configured to support image capture via the two camera lenses 204 and 206 and/or perform other imaging functions.

The image capture device 200 includes various indicators, for example, LEDs 208, 210 to indicate a status of the image capture device 100. The image capture device 200 may include a mode button 212 and a shutter button 214 configured to allow a user of the image capture device 200 to interact with the image capture device 200, to turn the image capture device 200 on, and to otherwise configure the operating mode of the image capture device 200. It should be appreciated, however, that, in alternate embodiments, the image capture device 200 may include additional buttons or inputs to support and/or control additional functionality.

The image capture device 200 may include an interconnect mechanism 216 for connecting the image capture device 200 to a handle grip or other securing device. In the example shown in FIGS. 2A and 2B, the interconnect mechanism 216 includes folding protrusions configured to move between a nested or collapsed position (not shown) and an extended or open position as shown that facilitates coupling of the protrusions to mating protrusions of other devices such as handle grips, mounts, clips, or like devices.

The image capture device 200 may include audio components 218, 220, 222 such as microphones configured to receive and record audio signals (e.g., voice or other audio commands) in conjunction with recording video. The audio component 218, 220, 222 can also be configured to play back audio signals or provide notifications or alerts, for example, using speakers. Placement of the audio components 218, 220, 222 may be on one or more of several surfaces of the image capture device 200. In the example of FIGS. 2A and 2B, the image capture device 200 includes three audio components 218, 220, 222, with the audio component 218 on a front surface, the audio component 220 on a side surface, and the audio component 222 on a back surface of the image capture device 200. Other numbers and configurations for the audio components are also possible.

The image capture device 200 may include an interactive display 224 that allows for interaction with the image capture device 200 while simultaneously displaying information on a surface of the image capture device 200. The interactive display 224 may include an I/O interface, receive touch inputs, display image information during video capture, and/or provide status information to a user. The status information provided by the interactive display 224 may include battery power level, memory card capacity, time elapsed for a recorded video, etc.

The image capture device 200 may include a release mechanism 225 that receives a user input to in order to change a position of a door (not shown) of the image capture device 200. The release mechanism 225 may be used to open the door (not shown) in order to access a battery, a battery receptacle, an I/O interface, a memory card interface, etc.

(not shown) that are similar to components described in respect to the image capture device 100 of FIGS. 1A and 1B.

In some embodiments, the image capture device 200 described herein includes features other than those described. For example, instead of the I/O interface and the interactive display 224, the image capture device 200 may include additional interfaces or different interface features. For example, the image capture device 200 may include additional buttons or different interface features, such as interchangeable lenses, cold shoes, and hot shoes that can add functional features to the image capture device 200.

Figure 2C:
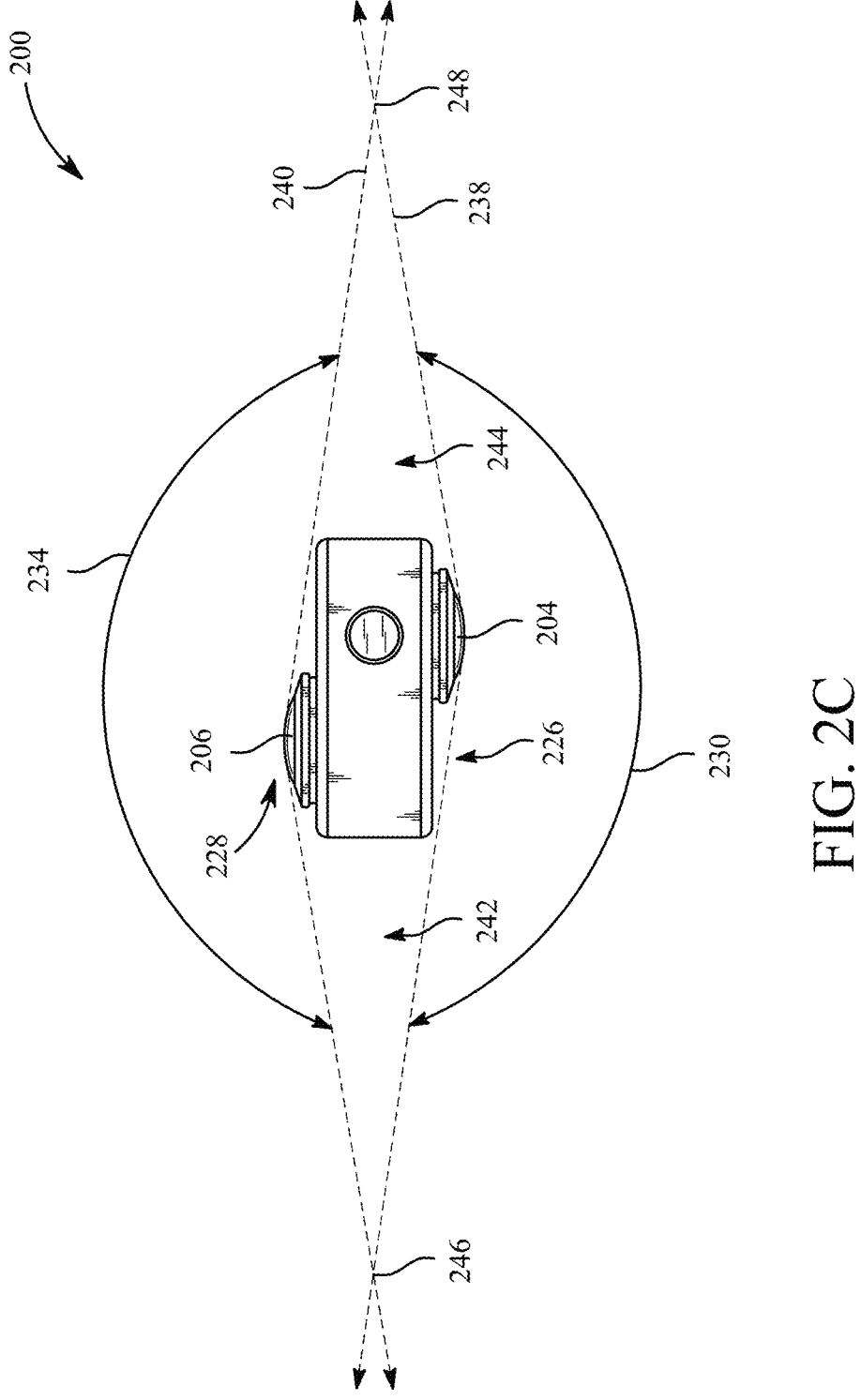
FIG. 2C is a top view of the image capture device of FIGS. 2A-B.
Figure 2D:
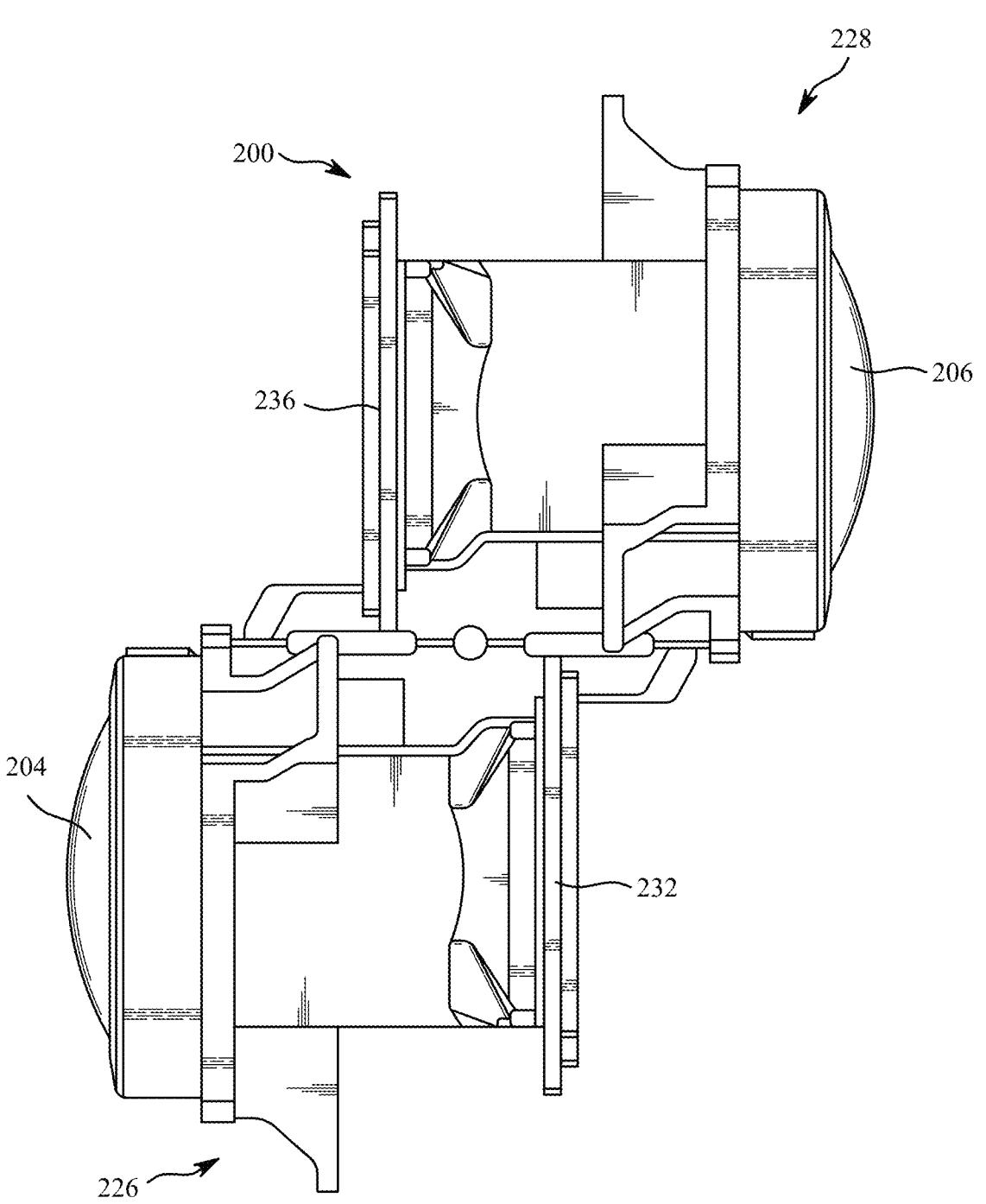
FIG. 2D is a partial cross-sectional view of the image capture device of FIG. 2C.

FIG. 2C is a top view of the image capture device 200 of FIGS. 2A-B and FIG. 2D is a partial cross-sectional view of the image capture device 200 of FIG. 2C. The image capture device 200 is configured to capture spherical images, and accordingly, includes a first image capture device 226 and a second image capture device 228. The first image capture device 226 defines a first field-of-view 230 and includes the lens 204 that receives and directs light onto a first image sensor 232. Similarly, the second image capture device 228 defines a second field-of-view 234 and includes the lens 206 that receives and directs light onto a second image sensor 236. To facilitate the capture of spherical images, the image capture devices 226 and 228 (and related components) may be arranged in a back-to-back (Janus) configuration such that the lenses 204, 206 face in generally opposite directions.

The fields-of-view 230, 234 of the lenses 204, 206 are shown above and below boundaries 238, 240 indicated in dotted line. Behind the first lens 204, the first image sensor 232 may capture a first hyper-hemispherical image plane from light entering the first lens 204, and behind the second lens 206, the second image sensor 236 may capture a second hyper-hemispherical image plane from light entering the second lens 206.

One or more areas, such as blind spots 242, 244 may be outside of the fields-of-view 230, 234 of the lenses 204, 206 so as to define a "dead zone." In the dead zone, light may be obscured from the lenses 204, 206 and the corresponding image sensors 232, 236, and content in the blind spots 242, 244 may be omitted from capture. In some implementations, the image capture devices 226, 228 may be configured to minimize the blind spots 242, 244.

The fields-of-view 230, 234 may overlap. Stitch points 246, 248 proximal to the image capture device 200, that is, locations at which the fields-of-view 230, 234 overlap, may be referred to herein as overlap points or stitch points. Content captured by the respective lenses 204, 206 that is distal to the stitch points 246, 248 may overlap.

Images contemporaneously captured by the respective image sensors 232, 236 may be combined to form a combined image. Generating a combined image may include correlating the overlapping regions captured by the respective image sensors 232, 236, aligning the captured fields-of-view 230, 234, and stitching the images together to form a cohesive combined image.

A slight change in the alignment, such as position and/or tilt, of the lenses 204, 206, the image sensors 232, 236, or both, may change the relative positions of their respective fields-of-view 230, 234 and the locations of the stitch points 246, 248. A change in alignment may affect the size of the blind spots 242, 244, which may include changing the size of the blind spots 242, 244 unequally.

Incomplete or inaccurate information indicating the alignment of the image capture devices 226, 228, such as the locations of the stitch points 246, 248, may decrease the accuracy, efficiency, or both of generating a combined image. In some implementations, the image capture device 200 may maintain information indicating the location and orientation of the lenses 204, 206 and the image sensors 232, 236 such that the fields-of-view 230, 234, the stitch points 246, 248, or both may be accurately determined; the maintained information may improve the accuracy, efficiency, or both of generating a combined image.

The lenses 204, 206 may be laterally offset from each other, may be off-center from a central axis of the image capture device 200, or may be laterally offset and off-center from the central axis. As compared to image capture devices with back-to-back lenses, such as lenses aligned along the same axis, image capture devices including laterally offset lenses may include substantially reduced thickness relative to the lengths of the lens barrels securing the lenses. For example, the overall thickness of the image capture device 200 may be close to the length of a single lens barrel as opposed to twice the length of a single lens barrel as in a back-to-back lens configuration. Reducing the lateral distance between the lenses 204, 206 may improve the overlap in the fields-of-view 230, 234. In another embodiment (not shown), the lenses 204, 206 may be aligned along a common imaging axis.

Images or frames captured by the image capture devices 226, 228 may be combined, merged, or stitched together to produce a combined image, such as a spherical or panoramic image, which may be an equirectangular planar image. In some implementations, generating a combined image may include use of techniques including noise reduction, tone mapping, white balancing, or other image correction. In some implementations, pixels along the stitch boundary may be matched accurately to minimize boundary discontinuities.

The image capture device 200 may be used to implement some or all of the techniques described in this disclosure, such as the technique 600 described in FIG. 6.

Figure 3:
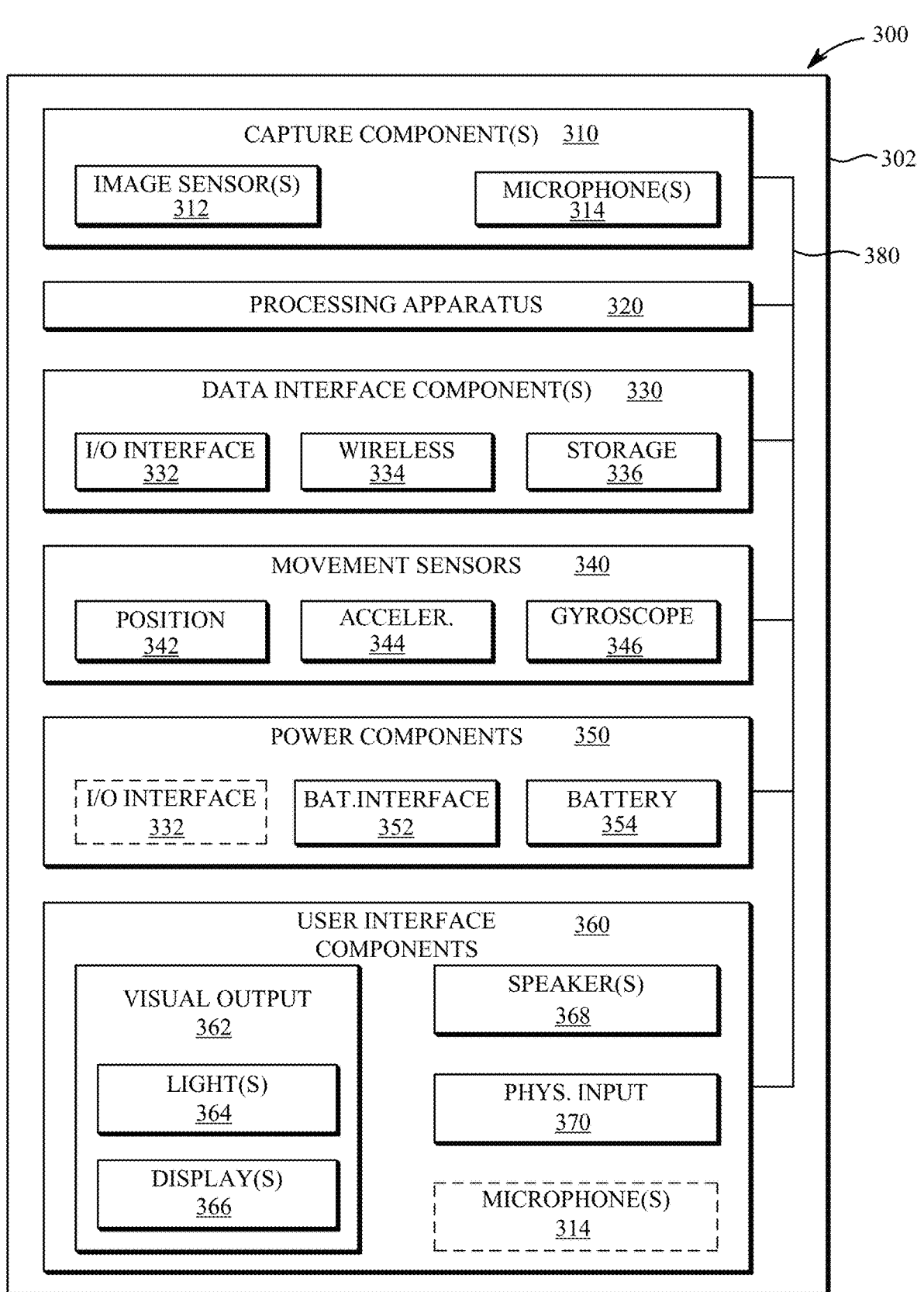
FIG. 3 is a block diagram of electronic components of an image capture device.

FIG. 3 is a block diagram of electronic components in an image capture device 300. The image capture device 300 may be a single-lens image capture device, a multi-lens image capture device, or variations thereof, including an image capture device with multiple capabilities such as use of interchangeable integrated sensor lens assemblies. The description of the image capture device 300 is also applicable to the image capture devices 100, 200 of FIGS. 1A-B and 2A-D.

The image capture device 300 includes a body 302 which includes electronic components such as capture components 310, a processing apparatus 320, data interface components 330, movement sensors 340, power components 350, and/or user interface components 360.

The capture components 310 include one or more image sensors 312 for capturing images and one or more microphones 314 for capturing audio.

The image sensor(s) 312 is configured to detect light of a certain spectrum (e.g., the visible spectrum or the infrared spectrum) and convey information constituting an image as electrical signals (e.g., analog or digital signals). The image sensor(s) 312 detects light incident through a lens coupled or connected to the body 302. The image sensor(s) 312 may be any suitable type of image sensor, such as a charge-coupled device (CCD) sensor, active pixel sensor (APS), complementary metal-oxide-semiconductor (CMOS) sensor, N-type metal-oxide-semiconductor (NMOS) sensor, and/or any other image sensor or combination of image sensors. Image signals from the image sensor(s) 312 may be passed to other electronic components of the image capture device 300 via a bus 380, such as to the processing apparatus 320. In some implementations, the image sensor(s) 312 includes a digital-to-analog converter. A multi-lens variation of the image capture device 300 can include multiple image sensors 312.

The microphone(s) 314 is configured to detect sound, which may be recorded in conjunction with capturing images to form a video. The microphone(s) 314 may also detect sound in order to receive audible commands to control the image capture device 300.

The processing apparatus 320 may be configured to perform image signal processing (e.g., filtering, tone mapping, stitching, and/or encoding) to generate output images based on image data from the image sensor(s) 312. The processing apparatus 320 may include one or more processors having single or multiple processing cores. In some implementations, the processing apparatus 320 may include an application specific integrated circuit (ASIC). For example, the processing apparatus 320 may include a custom image signal processor. The processing apparatus 320 may include an attenuation map. The processing apparatus 320 may exchange data (e.g., image data) with other components of the image capture device 300, such as the image sensor(s) 312, via the bus 380.

The processing apparatus 320 may include memory, such as a random-access memory (RAM) device, flash memory, or another suitable type of storage device, such as a non-transitory computer-readable memory. The memory of the processing apparatus 320 may include executable instructions and data that can be accessed by one or more processors of the processing apparatus 320. For example, the processing apparatus 320 may include one or more dynamic random-access memory (DRAM) modules, such as double data rate synchronous dynamic random-access memory (DDR SDRAM). In some implementations, the processing apparatus 320 may include a digital signal processor (DSP). More than one processing apparatus may also be present or associated with the image capture device 300.

The data interface components 330 enable communication between the image capture device 300 and other electronic devices, such as a remote control, a smartphone, a tablet computer, a laptop computer, a desktop computer, or a storage device. For example, the data interface components 330 may be used to receive commands to operate the image capture device 300, transfer image data to other electronic devices, and/or transfer other signals or information to and from the image capture device 300. The data interface components 330 may be configured for wired and/or wireless communication. For example, the data interface components 330 may include an I/O interface 332 that provides wired communication for the image capture device, which may be a USB interface (e.g., USB type-C), a high-definition multimedia interface (HDMI), or a FireWire interface. The data interface components 330 may include a wireless data interface 334 that provides wireless communication for the image capture device 300, such as a Bluetooth interface, a ZigBee interface, and/or a Wi-Fi interface. The data interface components 330 may include a storage interface 336, such as a memory card slot configured to receive and operatively couple to a storage device (e.g., a memory card) for data transfer with the image capture device 300 (e.g., for storing captured images and/or recorded audio and video).

The movement sensors 340 may detect the position and movement of the image capture device 300. The movement sensors 340 may include a position sensor 342, an accelerometer 344, or a gyroscope 346. The position sensor 342, such as a global positioning system (GPS) sensor, is used to determine a position of the image capture device 300. The accelerometer 344, such as a three-axis accelerometer, measures linear motion (e.g., linear acceleration) of the image capture device 300. The gyroscope 346, such as a three-axis gyroscope, measures rotational motion (e.g., rate of rotation) of the image capture device 300. Other types of movement sensors 340 may also be present or associated with the image capture device 300.

The power components 350 may receive, store, and/or provide power for operating the image capture device 300. The power components 350 may include a battery interface 352 and a battery 354. The battery interface 352 operatively couples to the battery 354, for example, with conductive contacts to transfer power from the battery 354 to the other electronic components of the image capture device 300. The power components 350 may also include the I/O interface 332, as indicated in dotted line, and the power components 350 may receive power from an external source, such as a wall plug or external battery, for operating the image capture device 300 and/or charging the battery 354 of the image capture device 300.

The user interface components 360 may allow the user to interact with the image capture device 300, for example, providing outputs to the user and receiving inputs from the user. The user interface components 360 may include visual output components 362 to visually communicate information and/or present captured images to the user. The visual output components 362 may include one or more lights 364 and/or more displays 366. The display(s) 366 may be configured as a touch screen that receives inputs from the user. The user interface components 360 may also include one or more speakers 368. The speaker(s) 368 can function as an audio output component that audibly communicates information and/or presents recorded audio to the user. The user interface components 360 may also include one or more physical input interfaces 370 that are physically manipulated by the user to provide input to the image capture device 300. The physical input interfaces 370 may, for example, be configured as buttons, toggles, or switches. The user interface components 360 may also be considered to include the microphone(s) 314, as indicated in dotted line, and the microphone(s) 314 may function to receive audio inputs from the user, such as voice commands.

The image capture device 300 may be used to implement some or all of the techniques described in this disclosure, such as the technique 600 described in FIG. 6.

Figure 4:
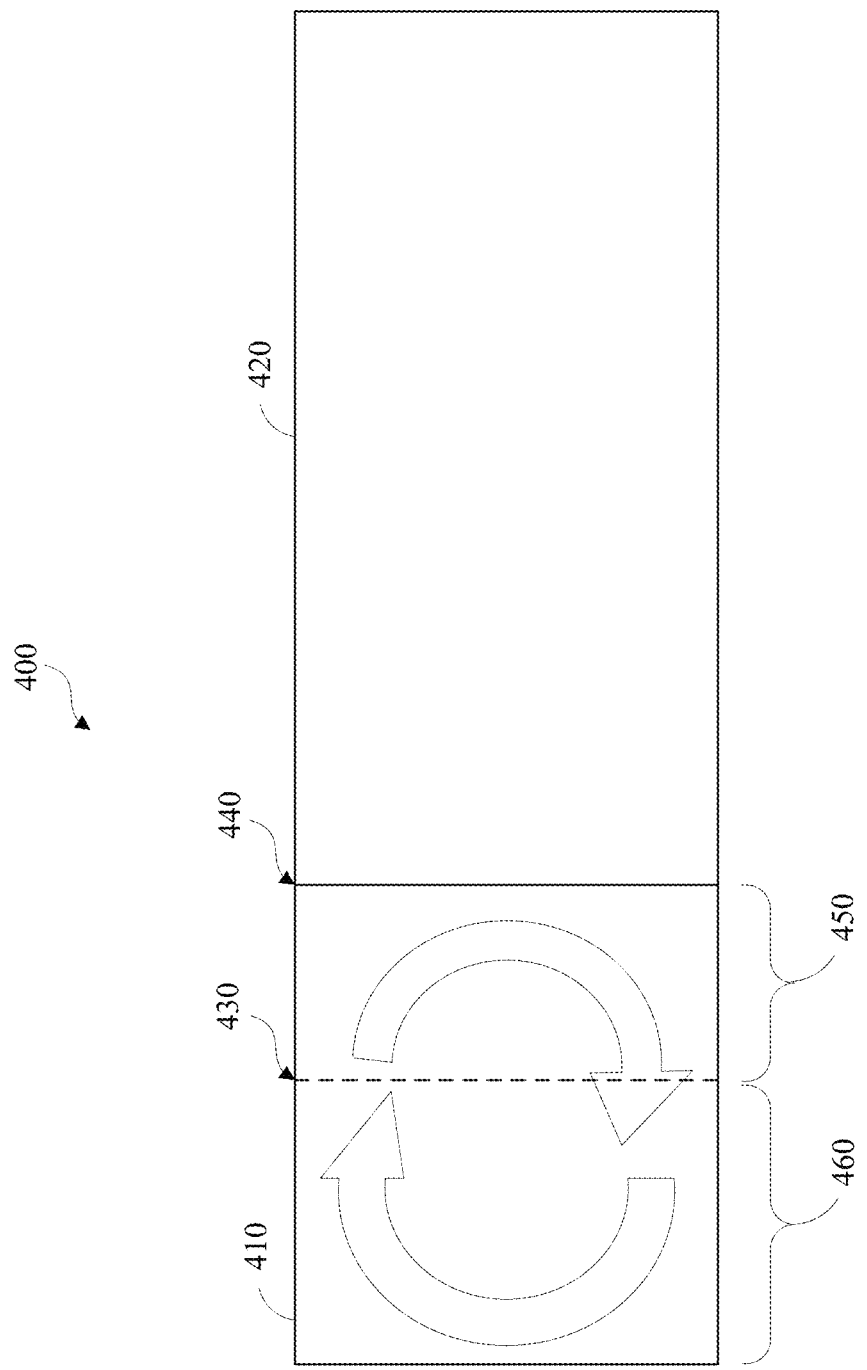
FIG. 4 is a diagram of an example of a recording timeline using a circular buffer.

FIG. 4 is a diagram of an example of a recording timeline 400 using a circular buffer. As shown in FIG. 4, the recording timeline 400 includes a circular buffer portion 410 and a linear recording portion 420. The circular buffer portion 410 may be referred to as a pre-buffer. A pre-buffer duration may be predetermined. In some implementations, the pre-buffer duration may be user configurable. For example, a user may configure the pre-buffer duration to be any duration of time, for example, 10 seconds, 20 seconds, 30 seconds, or any other duration. The circular buffer portion 410 may be implemented within a media file, such as an MP4 file, where after the pre-buffer duration has been reached, the image capture device begins encoding at the beginning of the circular buffer portion 410 again. When the shutter button is pressed, the point 430 in the circular buffer portion 410 is marked, and the recording proceeds from the end of the pre-buffer 440 until a second shutter button press is received indicating to stop the recording. The point 430 may be referred to as a wrap point or a shutter mark point.

In the example shown in FIG. 4, the pre-buffer duration has been reached and encoding has begun at the beginning of the circular portion 410 again such that the frames in portion 450 are recorded temporally prior to the frames in portion 460. Once the recording has stopped, the media file may be updated to start at the shutter mark point 430, the end of the pre-buffer 440 is set to jump to the beginning of the circular buffer 410, and then jump to the linear recording portion 420 when the shutter mark point 430 is reached. Accordingly, in this example, the video frames are arranged such that portion 450 is first, portion 460 is second, and the linear recording portion 420 is third.

Figure 5:
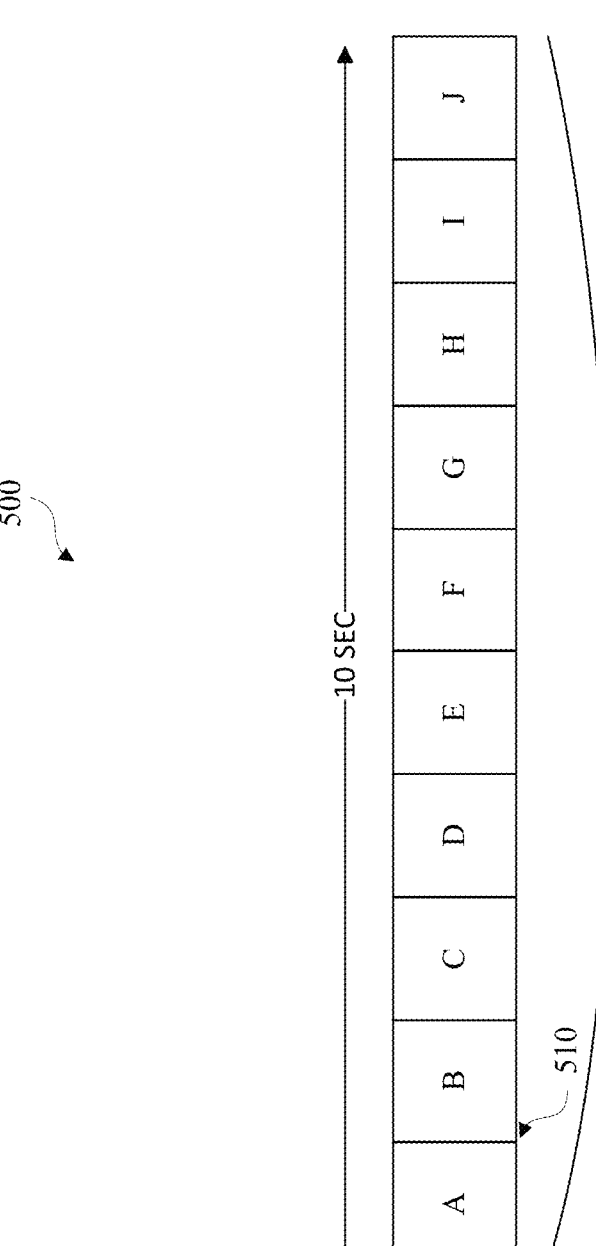
FIG. 5 is a diagram of an example of a circular buffer segmentation with overwriting.

FIG. 5 is a diagram of an example of a circular buffer segmentation 500 with overwriting. In this example, the circular buffer is shown to have 10 segments A-J. The circular buffer duration may be any duration of time, and may be user configurable. In this example, the circular buffer duration is 10 seconds. Accordingly, each segment A-J has a duration of 1 second in this example. In some implementations, the duration for each segment may be user configurable.

In this example, recording begins at the beginning of the pre-buffer, shown as image capture segment A. Recording then continues to image capture segment B, image capture segment C, and so on, until the end of the pre-buffer is reached at image capture segment J. Since there is no next adjacent image capture segment after image capture segment J, the recording continues by overwriting image capture segment A and continues until a key moment command 510 is received. A key moment command is associated with a shutter button press, an audio command, or a touch display input, and indicates a desirable moment for image capture.

In this example, 10 seconds are recorded in 1 second segments A-J. The $11^{th}$ second is recorded in the image capture segment A, thereby overwriting the $1^{st}$ second recording. As shown in FIG. 5, the key moment command 510 is received in the $12^{th}$ second of recording. When the key moment command 510 is received, the image capture device stops recording in the circular buffer and begins linear recording until an input is received. The input may be associated with a shutter button press, an audio command, or a touch display input, and may indicate to stop recording.

When the key moment command 510 is received at the $12^{th}$ second of recording, the recording includes seconds 2-11, i.e., image capture segments B-J including seconds 2-10 and image capture segment A that includes the $11^{th}$ second. In this example, image capture segments B-J may correspond to portion 450 shown in FIG. 4, and image capture segment A may correspond to portion 460 shown in FIG. 4.

FIG. 6 is a flow diagram of an example method 600 for pre-buffer media storage. As shown in FIG. 6, the method 600 includes recording 605 an image capture segment. The image capture segment is recorded in a circular buffer. The circular buffer may be a portion of a media file stored on a secure data (SD) card. The media file may be any type of file, for example, an MP4 file. The circular buffer includes a number of predetermined recordable segments. The number of predetermined recordable segments may be user configurable, and may include any number of recordable segments. The duration of the circular buffer may be user configurable, and may be for any duration, for example 10 seconds, 20 seconds, or 30 seconds. The duration of each of the predetermined recordable segments may be based on the duration of the circular buffer and the number of recordable segments. For example, if the circular buffer duration is 10 seconds and there are 10 recordable segments, each recordable segment would have a 1 second duration. The duration of each recordable segment may range from 0.5 seconds to 30 seconds.

The method 600 includes determining 610 whether a key moment command is received. If a key moment command is not received, the method 600 includes determining 615 whether a next adjacent recordable segment is available. If the next adjacent recordable segment is available, the method 600 includes recording 620 the next segment. If the next adjacent recordable segment is not available, the method 600 include overwriting 625 the oldest recordable segment. For example, if the end of the circular buffer is reached and there is no next adjacent recordable segment, recording continues by returning to the beginning of the circular buffer and overwriting the first recordable segment.

If it is determined 610 that a key moment command is received, the method 600 includes stopping 630 the circular buffer recording and starting 635 linear recording. Stopping 630 the circular buffer may include marking a wrap point or shutter mark point. The linear recording may be stored in a second portion of the media file. The second portion of the media file is outside the circular buffer. The linear recording may be stored on the SD card.

The method 600 includes determining 640 whether an indication of an input was received. The input may be an indication of a second shutter button press, a voice command, or a touch display input that indicates to stop linear recording. If an indication of a second shutter button press is received, the method includes stopping 645 linear recording and continuing recording in the circular buffer. If an indication of a second shutter button press is not received, the method 600 includes continuing 650 linear recording.

Figure 7:
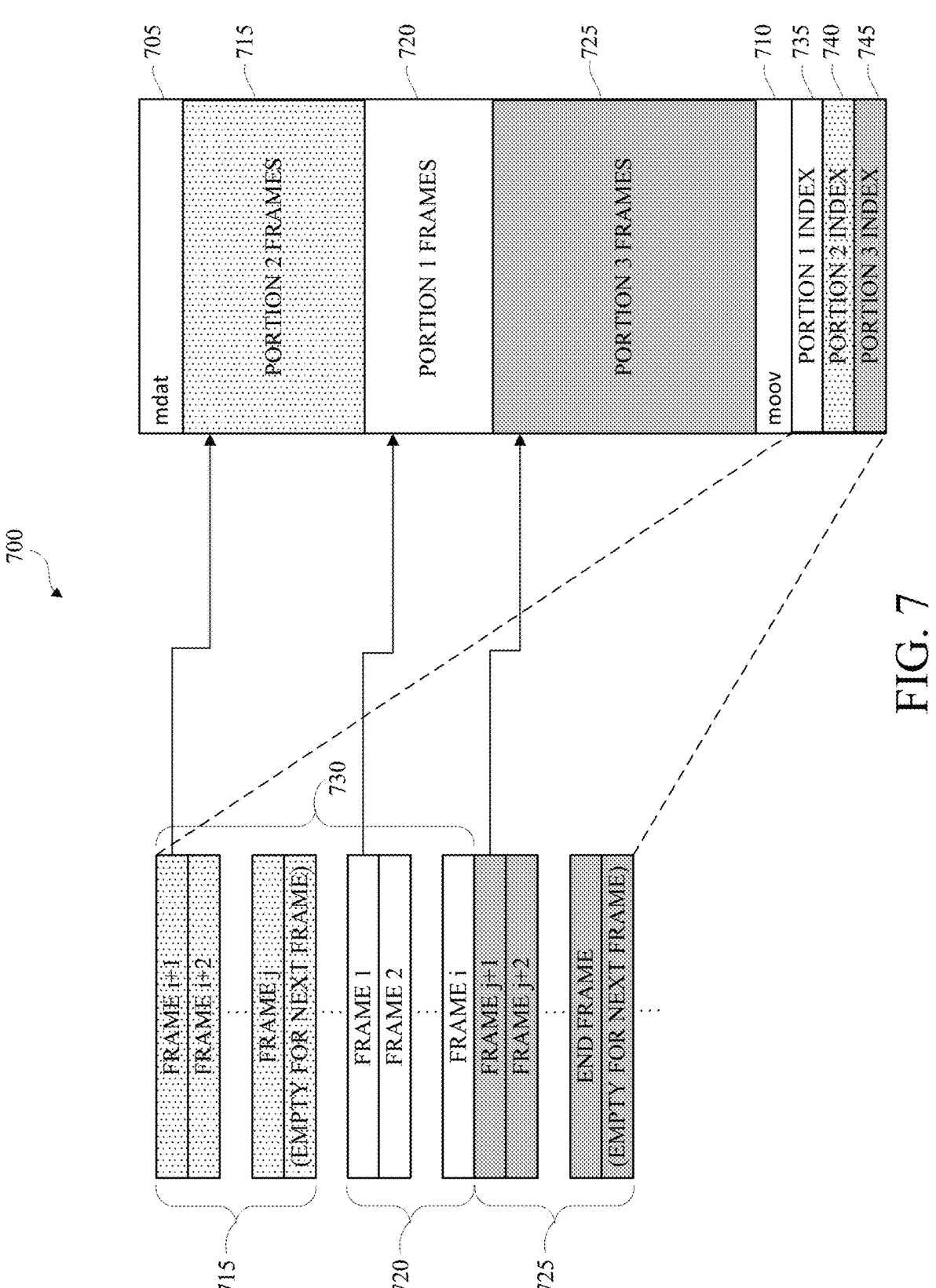
FIG. 7 is a diagram of an example of a media file format with a circular buffer.

FIG. 7 is a diagram of an example of a media file format 700 with a circular buffer. The media file format 700 may be any type of media file, for example, and MP4 format. As shown in FIG. 7, the media file format 700 includes an mdat portion 705 and a moov portion 710. The mdat portion 705 may be encoded in real-time or near real-time in a memory such as an SD card during the recording. The moov portion 710 may be constructed in a RAM, for example as an index table in DDR, and then transferred to the SD card after recording.

As shown in FIG. 7, the mdat portion 705 includes portion 2 frames 715 (shown in stippling), portion 1 frames 720, and portion 3 frames 725 (shown in shading). The portion 2 frames 715 and portion 1 frames 720 are the collective frames of the pre-buffer 730. The portion 1 frames 720 include the first recorded frame, frame 1, to the last recorded frame of the pre-buffer, i.e., frame i. The portion 2 frames 715 include the next recorded frame after frame i, i.e., frame i+1, to the frame where a key moment command or indication of a shutter press is received, i.e., frame j. In some examples, an empty frame for the next frame may be included in the portion 2 frames 715. the portion 3 frames 725 are the linear recording frames and include frame j+1 to the end frame where an indication to stop recording is received. In some examples, an empty frame for the next frame may be included in the portion 3 frames 725.

The moov portion 710 is an index for which the playback order is based. The moov portion 710 includes a portion 1 index 735, a portion 2 index 740, and a portion 3 index 745. The portion 1 index 735 is associated with the portion 1 frames 720. The portion 2 index 740 is associated with the portion 2 frames 715. The portion 3 index 745 is associated with the portion 3 frames 725. Accordingly, even though the mdat portion 705 is arranged with the portion 2 frames 715 organized first, followed by the portion 1 frames 720 and portion 3 frames 725, respectively, the moov portion 710 is used to ensure that the correct playback order is portion 1 frames 720 first, followed by portion 2 frames 715 and portion 3 frames 725, respectively.

Figure 8:
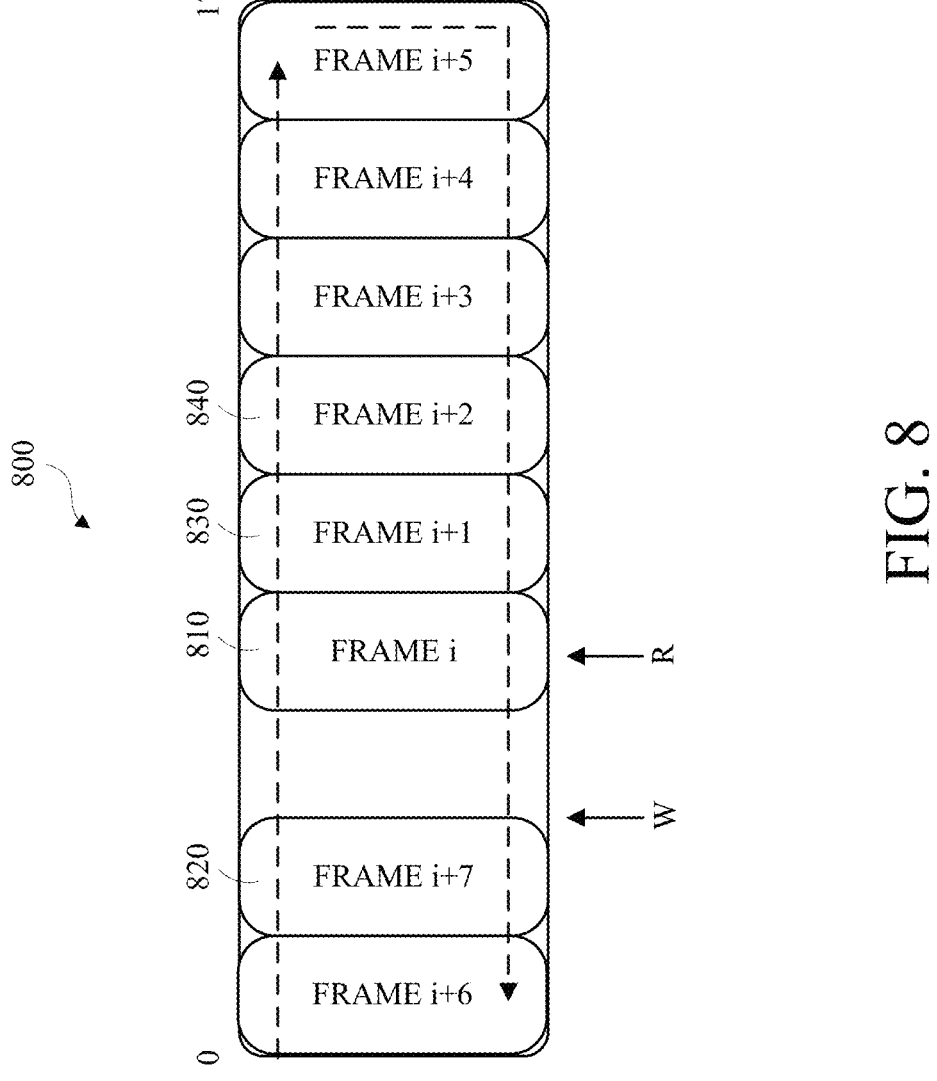
FIG. 8 is a diagram of an example of a pre-buffer where the size of the pre-buffer is based on a determined time duration.

FIG. 8 is a diagram of an example of a pre-buffer 800 where the size of the pre-buffer 800 is based on a determined time duration. The time duration may be determined based on an obtained user input. In this example, the pre-buffer 800 is configured to handle an input stream that maintains an approximate constant bitrate, and the size of the pre-buffer 800 may be determined by a time duration, plus some extra time (e.g., 2 seconds) as a safe zone. The safe zone is added to handle slight bitrate fluctuation. In the example shown in FIG. 8, the determined time duration may be 15 seconds, plus an additional 2 seconds as the safe zone, for a total of 17 seconds. In this example, the data will wrap to the beginning of the pre-buffer 800 when 17 seconds worth of data is filled in the pre-buffer. Accordingly, starting from the $18^{th}$ second, old data will be overwritten by new data in the pre-buffer 800. In addition, every 17 seconds worth of data will be overwritten by the next 17 seconds of data. In this example, the constant bit rate may be set at 100 Mbps output, and therefore the maximum bitrate will be 100 Mbps. Accordingly, the pre-buffer size for the determined 15 second time duration (including a 2 second safe zone) may be calculated as 100 Mbps/8*17 seconds=212.5 MB.

In a constant bitrate example, the read point R and write point W both move at approximately the same speed. If the bitrate significantly increases in the 17 second period as compared to the previous period, the write point W will catch up to the read point R, which results in a frame$_i$ 810 being overwritten by a frame$_{i+7}$ 820. In some examples, the write point W may overtake the read point R, and additional frames, such as a frame$_{i+1}$ 830 and a frame$_{i+2}$ 840 may be overwritten if the increase in bitrate is substantial.

Figure 9:
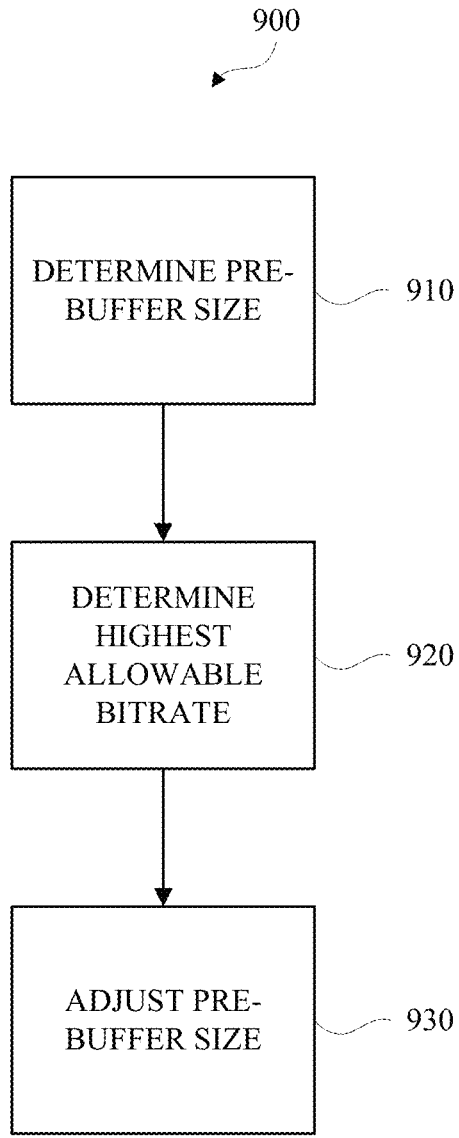
FIG. 9 is a flow diagram of an example of a method for pre-buffer media storage for an input stream that has a variable bitrate.

FIG. 9 is a flow diagram of an example method 900 for pre-buffer media storage for an input stream that has a variable bitrate. The example method 900 is described with reference to the pre-buffer 800 shown in FIG. 8. In some implementations, the method 900 may be used in conjunction with the method 600 shown in FIG. 6.

At 910, the method 900 includes determining the pre-buffer size. The pre-buffer size may be based on a time duration. For example, the time duration may be determined by obtaining a user input that indicates the time duration and calculated based on a bitrate of a current period. In this context, a period is the duration (i.e., size) of the pre-buffer 800. The time duration may be based on a predetermined number of recordable segments. For example, based on a bitrate of a current 17 second period, there may be a scenario where the size of the pre-buffer 800 is insufficient when the bitrate of the next 17 second period is substantially higher than the bitrate of the current 17 second period.

In an example where the size of the pre-buffer is determined to be insufficient, the method 900 includes determining a highest allowable bitrate for the input stream at 920. The highest allowable bitrate may be determined based on one or more parameters of a video encoder, test results in different scene encoding, or both. Example test results may include results associated with a light condition, object motion, or another scene encoding aspect. At 930, the method 900 includes adjusting the pre-buffer size. The pre-buffer size may be adjusted dynamically, for example, based on the highest allowable bitrate. Adjusting the pre-buffer size may include increasing or decreasing the number of predetermined recordable segments. The adjusted pre-buffer size may be determined by multiplying the highest allowable bitrate and the current time duration. In this example, a firmware writer will not wrap to the beginning of the pre-buffer at the $17^{th}$ second, and instead, the firmware writer will wrap when the adjusted pre-buffer size is reached, regardless of the bitrate of the current period.

In some implementations, the safe zone may be increased to match the pre-buffer duration. For example, if the pre-buffer has a duration of 15 seconds, the safe zone will also have a duration of 15 seconds. Accordingly, the total duration of the pre-buffer in this example would be 30 seconds.

In some implementations, the firmware reader may be aware of the position of the write point W. If a frame$_i$, such as the frame$_i$ 810, is overwritten, the read point R may be moved to the next frame. When this happens, the pre-buffer duration will be less than the determined 15 seconds. This is to ensure that when the increased pre-buffer size is insufficient, the output of the pre-buffer does not contain corrupted frames.

Figure 10:
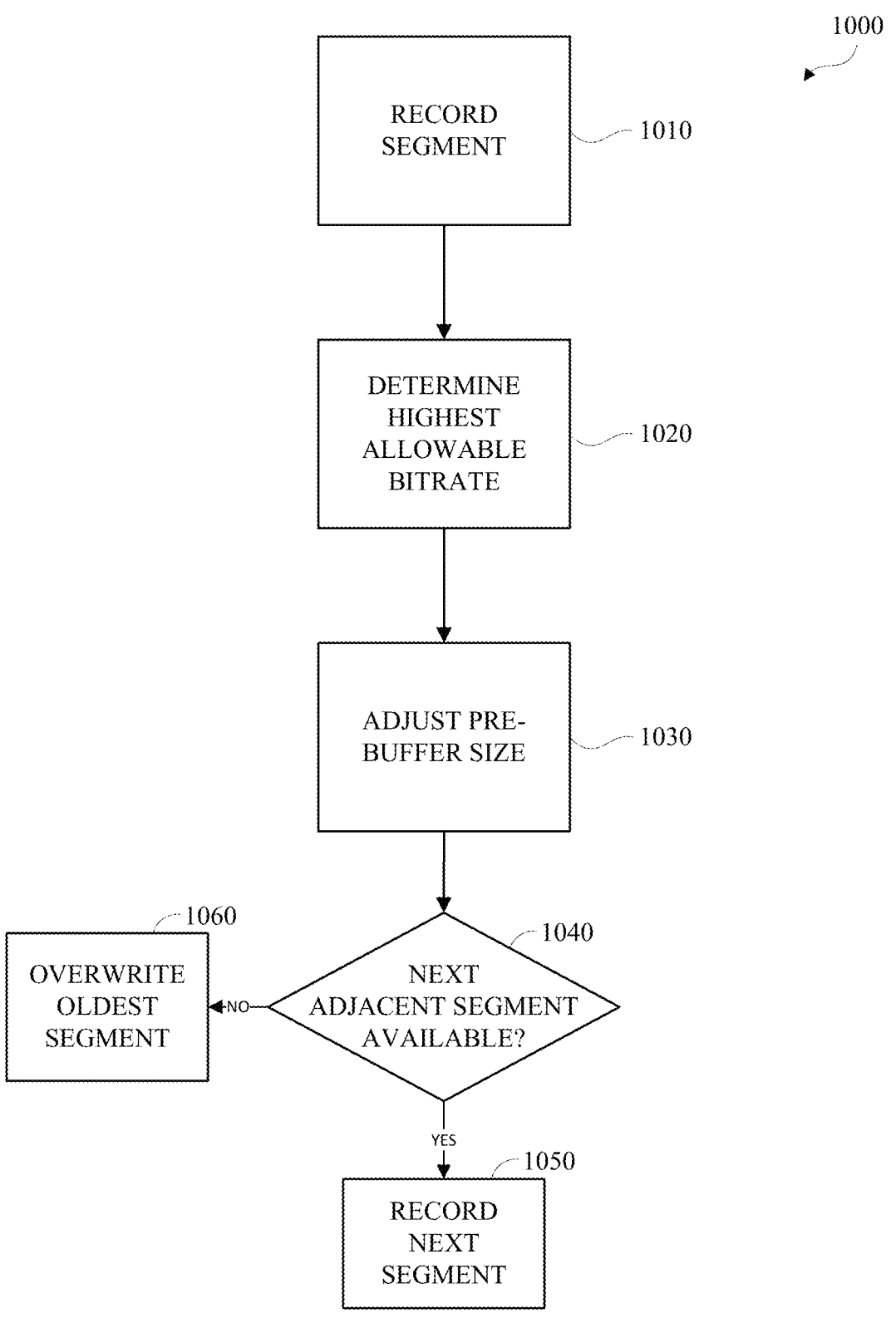
FIG. 10 is a flow diagram of another example of a method for pre-buffer media storage for an input stream that has a variable bitrate.

FIG. 10 is a flow diagram of another example of a method 1000 for pre-buffer media storage for an input stream that has a variable bitrate. In some implementations, the method 1000 may be used in conjunction with the method 600 shown in FIG. 6. As shown in FIG. 10, the method 1000 includes recording an image capture segment of a variable bitrate input stream at 1010. The image capture segment is recorded in a pre-buffer (e.g., circular buffer). The pre-buffer may be a portion of a media file stored on an SD card. The media file may be any type of file, for example, an MP4 file. The pre-buffer includes a number of predetermined recordable segments. The number of predetermined recordable segments may be user configurable and may include any number of recordable segments. The duration of the pre-buffer may be user configurable, and may be for any duration, for example, 10 seconds, 15 seconds, 20 seconds, or 30 seconds. The duration of each of the predetermined recordable segments may be based on the duration of the pre-buffer and the number of recordable segments. For example, if the pre-buffer duration is 10 seconds and there are 10 recordable segments, each recordable segment would have a 1 second duration. The duration of each recordable segment may range from 0.5 seconds to 30 seconds.

In an example where the size of the pre-buffer is determined to be insufficient, the method 1000 includes determining a highest allowable bitrate for the input stream at 1020. The highest allowable bitrate may be determined based on one or more parameters of a video encoder, test results in different scene encoding, or both. Example test results may include results associated with a light condition, object motion, or another scene encoding aspect. At 1030, the method 1000 includes adjusting the pre-buffer size. The pre-buffer size may be adjusted dynamically, for example, based on the highest allowable bitrate. Adjusting the pre-buffer size may include increasing or decreasing the number of predetermined recordable segments or increasing or decreasing the size of each of the predetermined recordable segments. The adjusted pre-buffer size may be determined by multiplying the highest allowable bitrate and the current time duration. In this example, where the pre-buffer may have a 15 second duration plus a 2 second safe zone, a firmware writer will not wrap to the beginning of the pre-buffer at the $17^{th}$ second, and instead, the firmware writer will wrap when the adjusted pre-buffer size is reached, regardless of the bitrate of the current period.

In some implementations, determining the highest allowable bitrate 1020, adjusting the pre-buffer size 1030, or both, may be performed prior to recording an image capture segment 1010 of a variable bitrate input stream.

In some implementations, the safe zone may be increased to match the pre-buffer duration. For example, if the pre-buffer has a duration of 20 seconds, the safe zone will also have a duration of 20 seconds. Accordingly, the total duration of the pre-buffer in this example would be 40 seconds.

In some implementations, the firmware reader may be aware of the position of the write point W. If a frame$_i$, such as the frame$_i$ 810, is overwritten, the read point R may be moved to the next frame. When this happens, the pre-buffer duration will be less than a determined pre-buffer size, for example, a determined 30 second pre-buffer size. This is to ensure that when the increased pre-buffer size is insufficient, the output of the pre-buffer does not contain corrupted frames.

The method 1000 includes determining 1040 whether a next adjacent recordable segment is available. If the next adjacent recordable segment is available, the method 1000 includes recording 1050 the next segment. If the next adjacent recordable segment is not available, the method 1000 includes overwriting 1060 the oldest recordable segment. For example, if the end of the pre-buffer is reached and there is no next adjacent recordable segment, recording continues by returning to the beginning of the circular buffer and overwriting the first recordable segment.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A pre-buffering method comprising:
   recording an image capture segment of a variable bitrate input stream in a circular buffer, wherein the circular buffer includes a duration based on a predetermined number of recordable segments;
   determining a highest allowable bitrate for the variable bitrate input stream;
   dynamically adjusting the duration of the circular buffer based on the highest allowable bitrate;
   recording a next image capture segment in a next adjacent recordable segment of the circular buffer on a condition that the next adjacent recordable segment of the predetermined number of recordable segments is available; and
   overwriting an oldest recordable segment on a condition that the next adjacent recordable segment of the predetermined number of recordable segments is not available.

2. The pre-buffering method of claim 1, further comprising:
   switching from recording in the circular buffer to linear recording when a command is received.

3. The pre-buffering method of claim 2, wherein linear recording comprises recording frames in a portion of a memory outside the circular buffer.

4. The pre-buffering method of claim 1, wherein each of the predetermined number of recordable segments has a predetermined duration of time.

5. The pre-buffering method of claim 4, wherein the predetermined duration of time is 0.5 seconds to 30 seconds.

6. The pre-buffering method of claim 1, wherein dynamically adjusting the duration of the circular buffer includes increasing or decreasing a number of the predetermined number of recordable segments.

7. The pre-buffering method of claim 1, further comprising:
   switching from recording in the circular buffer to linear recording;
   determining whether an input is received;
   on a condition that the input is received, stopping the linear recording; and
   on a condition that the input is not received, continuing the linear recording.

8. The pre-buffering method of claim 7, wherein the input is a button press, an audio command, or a touch display input.

9. The pre-buffering method of claim 8, wherein the input is an indication or command to stop linear recording.

10. An image capture device comprising:
    a memory comprising a circular buffer configured to record an image capture segment of a variable bitrate input stream, wherein the circular buffer includes a duration based on a predetermined number of recordable segments; and
    a processor configured to:
       determine a highest allowable bitrate for the variable bitrate input stream; and
       dynamically increase a number of the predetermined number of recordable segments based on the highest allowable bitrate to adjust the duration of the circular buffer;
    wherein the memory is further configured to:
       record a next image capture segment in a next adjacent recordable segment of the circular buffer on a condition that the next adjacent recordable segment of the increased number of the predetermined number of recordable segments is available; and
       overwrite an oldest recordable segment on a condition that the next adjacent recordable segment of the increased number of the predetermined number of recordable segments is not available.

11. The image capture device of claim 10, wherein the processor is further configured to stop the circular buffer recording.

12. The image capture device of claim 10, wherein the memory is configured to perform linear recording by recording frames in a portion of the memory outside the circular buffer.

13. The image capture device of claim 12, wherein the processor is further configured to:
    determine whether an input is received;
    on a condition that the input is received, stop the linear recording; and
    on a condition that the input is not received, continue the linear recording.

14. The image capture device of claim 10, wherein the memory is a secure digital (SD) card.

15. A storage device comprising:
    a memory comprising a dynamically adjustable circular buffer configured to:
       record a data segment of a variable bitrate input stream, wherein the dynamically adjustable circular buffer includes a predetermined number of recordable segments;
    dynamically adjust a number of the predetermined number of recordable segments based on the variable bitrate input stream;
    record a next data segment in a next adjacent recordable segment of the dynamically adjustable circular buffer on a condition that the next adjacent recordable segment of the adjusted number of the predetermined number of recordable segments is available; and overwrite an oldest recordable segment on a condition that the next adjacent recordable segment of the adjusted number of the predetermined number of recordable segments is not available.

16. The storage device of claim 15, wherein the memory is configured to store the dynamically adjustable circular buffer and a linear recording portion in a media file format, wherein the media file format comprises a first portion and a second portion, and wherein the first portion is an mdat portion and the second portion is a moov portion.

17. The storage device of claim 16, wherein the mdat portion comprises a pre-buffer portion and a linear recording portion.

18. The storage device of claim 17, wherein the pre-buffer portion comprises a first portion of frames and a second portion of frames, wherein the first portion of frames are recorded temporally prior to the second portion of frames, and wherein the second portion of frames are stored spatially prior to the first portion of frames.

19. The storage device of claim 18, wherein the linear recording portion comprises a third portion of frames, wherein the third portion of frames are recorded temporally after the first portion of frames and the second portion of frames, wherein the third portion of frames are stored spatially after the first portion of frames and the second portion of frames, and wherein the third portion of frames are stored adjacent to the first portion of frames.

20. The storage device of claim 19, wherein the moov portion comprises a first index associated with the first portion of frames, a second index associated with the second portion of frames, and a third index associated with the third portion of frames, and wherein the first index, the second index, and the third index are used for video playback.

\* \* \* \* \*